(12) United States Patent
Sande et al.

(10) Patent No.: US 9,356,488 B2
(45) Date of Patent: May 31, 2016

(54) LAMINATED CORE FOR A MAGNETIC BEARING HAVING INDIVIDUAL LAMINATIONS WITH AT LEAST ONE PHYSICAL INTERRUPTION AND METHOD FOR CONSTRUCTING SUCH A LAMINATED CORE

(75) Inventors: Hans Vande Sande, Mortsel (BE); Cornelis Theodorus Philippi, Wilrijk (BE); Uwe Pahner, Leuven (BE); Bram Eugene G. Demeulenaere, Merelbeke (BE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 223 days.

(21) Appl. No.: 13/508,235

(22) PCT Filed: Nov. 2, 2010

(86) PCT No.: PCT/BE2010/000075
§ 371 (c)(1),
(2), (4) Date: May 4, 2012

(87) PCT Pub. No.: WO2011/054065
PCT Pub. Date: May 12, 2011

(65) Prior Publication Data
US 2012/0212093 A1    Aug. 23, 2012

Related U.S. Application Data

(60) Provisional application No. 61/272,821, filed on Nov. 6, 2009.

(30) Foreign Application Priority Data

Dec. 23, 2009    (BE) .................................. 2009/0817

(51) Int. Cl.
*H02K 1/14*    (2006.01)
*H02K 7/09*    (2006.01)
(Continued)

(52) U.S. Cl.
CPC ................ *H02K 7/09* (2013.01); *F16C 32/048* (2013.01); *F16C 32/0461* (2013.01);
(Continued)

(58) Field of Classification Search
CPC ........... H02K 1/14; H02K 1/04; H02K 1/141; H02K 1/143; H02K 1/148
USPC .................... 310/216.044, 216.008, 216.009, 310/216.011, 216.015, 90.5
See application file for complete search history.

(56) References Cited

U.S. PATENT DOCUMENTS 5,514,924 A  *  5/1996  McMullen et al. .......... 310/90.5
6,265,804 B1 *  7/2001  Nitta et al. ............. 310/216.066
(Continued)

FOREIGN PATENT DOCUMENTS

CN    1737388 A    2/2006
GB    1173447      12/1969
(Continued)

OTHER PUBLICATIONS

International Search Report in corresponding PCT Application No. PCT/BE2010/000075 dated Oct. 27, 2011.
(Continued)

*Primary Examiner* — Michael Andrews
(74) *Attorney, Agent, or Firm* — Bacon & Thomas, PLLC

(57) ABSTRACT

The core of a combined radial-axial magnetic bearing is stacked with coated laminations each equipped with at least one radial cut (9). These cuts (9) prevent the induction of circulating currents caused by varying axial control fluxes through the central hole of the lamination stack. Magnetic symmetry is preserved by rotating every lamination with respect to the previous one.

14 Claims, 11 Drawing Sheets

(51) Int. Cl.
*F16C 32/04* (2006.01)
*H01F 3/02* (2006.01)
*H01F 41/02* (2006.01)
*H02K 1/12* (2006.01)
*H02K 1/22* (2006.01)
*H01F 3/14* (2006.01)

(52) U.S. Cl.
CPC ............ *F16C 32/0485* (2013.01); *H01F 3/02* (2013.01); *H01F 41/0233* (2013.01); *H02K 1/12* (2013.01); *H02K 1/22* (2013.01); *H01F 3/14* (2013.01); *H02K 1/148* (2013.01); *Y10T 156/10* (2015.01)

(56) References Cited

U.S. PATENT DOCUMENTS

| | | | |
|---|---|---|---|
| 6,268,674 | B1 | 7/2001 | Takahashi |
| 6,359,357 | B1 | 3/2002 | Blumenstock |
| 6,727,617 | B2 | 4/2004 | McMullen et al. |
| 2003/0066183 | A1 | 4/2003 | Nouzumi |
| 2006/0279160 | A1* | 12/2006 | Yoshinaga et al. ............ 310/216 |
| 2009/0026851 | A1 | 1/2009 | Liou |

FOREIGN PATENT DOCUMENTS

| | | | |
|---|---|---|---|
| GB | 2108772 A | * | 5/1983 |
| JP | 58-042824 A | | 3/1983 |
| JP | 2000188835 A | | 7/2000 |
| JP | 2007020386 A | | 1/2007 |
| JP | 2007295740 A | | 11/2007 |
| WO | 2008/074045 A2 | | 6/2008 |

OTHER PUBLICATIONS

P. Imoberdorf et al., "Combined Radial-Axial Magnetic Bearing for a 1 kW, 500,000 rpm Permanent Magnet Machine", Applied Electronics Conference, PEC 2007, Feb. 1, 2007, pp. 1434-1440.

Pichot et al., "Loss Reduction Strategies in Design of Magnetic Bearing Actuators for Military Vehicle Applications", Electromagnetic Launch Technology, 2004, pp. 508-513.

Pichot et al., "Active Magnetic Bearings for Energy Storage Systems for Combat Vehicles", IEEE Transactions on Magnetics, IEEE Service Center, Jan. 1, 2001, vol. 37, No. 1, pp. 318-323.

European Office Action dated Jun. 24, 2015, for EP 10807315.6.

* cited by examiner

LAMINATED CORE FOR A MAGNETIC BEARING HAVING INDIVIDUAL LAMINATIONS WITH AT LEAST ONE PHYSICAL INTERRUPTION AND METHOD FOR CONSTRUCTING SUCH A LAMINATED CORE

CROSS REFERENCE TO RELATED APPLICATION

The benefit of the filing of provisional application No. 61/272,821 on Nov. 16, 2009 is claimed and the entirety of said application is hereby incorporated herein by reference.

FIELD OF THE INVENTION

The invention relates to magnetic bearings for rotating machines, in which the bearing has an integrated radial-axial design and in which the axial control flux flows through the central opening of a soft-magnetic core.

BACKGROUND OF THE INVENTION

With magnetic bearings contactless suspension can be obtained. Their limited friction losses make them attractive for high-speed applications. The design of rotary high-speed machines is often complicated due to rotor dynamic limitations. In that sense, any reduction of the axial length of a shaft contributes to the rotor dynamic margin. This property is maximally exploited in so-called combo bearings. These are bearings wherein the design integrates axial and radial channels in a compact arrangement in which several functional parts are shared.

Various examples of combo bearings can be found in patents and literature. Often, the path of the axial control flux crosses the central hole of a laminated stack of ferromagnetic material. Examples of this can be found in patents or patent applications U.S. Pat. No. 5,514,924, U.S. Pat. No. 6,268,674, U.S. Pat. No. 6,727,617, WO 2008074045, CN 1737388. Other examples are found in literature, as e.g in the papers by Imoberdorf et al., Pichot et al. and Buckner et al. In combo bearings of the type depicted in patent U.S. Pat. No. 6,359,357 B1 of Blumenstock, the axial control flux does not cross the central hole of a laminated stack of ferromagnetic material.

The axial channel performance of a combo bearing may be adversely affected if the path of the axial control flux crosses the central hole of a laminated stack or, more generally, if a combo bearing contains an area where an electrically conductive path surrounds the control flux. In that case, varying control fluxes can induce voltages in the surrounding material. These induced voltages cause circulating currents, thus Joule losses as well, if the surrounding path is closed and electrically conductive. Actually, such a laminated stack can be considered being a short circuited secondary coil of a transformer, the axial control coil being the primary coil. The effect is frequency dependent: the loss grows with frequency. Given a particular axial control current and frequency, Joule losses reduce the force that can be realized. Consequently, the performance of the axial channel is affected.

Similar phenomena may occur in the lamination stack on which the axial actuator acts. In that case the control flux enters the stack itself, but the physical explanation is the same. In patent U.S. Pat. No. 6,268,674, Takahashi proposes to cut a series of evenly distributed radial slits inside such a target lamination stack. Obviously, in order to maintain sufficient strength while rotating, the laminations are not cut over their entire thickness. By doing so, induced currents remain local, provided the control flux exclusively enters the slit region. This technique only provides a solution for reducing the losses in the target lamination stack. The global control flux is still surrounded by the stator stack.

To our knowledge, other techniques for reducing this kind of losses have not been reported. In this patent, a different technique for loss reduction is presented. It may be applied to both rotor and stator stacks of a combo magnetic bearing.

SUMMARY OF THE INVENTION

The present invention relates to a laminated core of a stator or a rotor of a permanent magnet biased or current biased combined radial-axial magnetic bearing. The laminated core comprises a solid stack of flat soft-magnetic individual laminations. The individual laminations have the topological property of being homotopically equivalent to a ball so as to create at least one complete physical interruption for circulating currents in the plane of the laminations. The solid stack has the topological property of being homotopically equivalent to a ring so as to create magnetic symmetry. At least one physical interruption is filled with an electrically insulating material, and:

said at least one physical interruption in adjacent laminations are pivoted with respect to each other; or said solid stack comprises a plurality of substacks in which said at least one physical interruption in all adjacent laminations coincide and wherein said at least one physical interruption of said substacks are pivoted with respect to each other.

In this context, a circulating current is defined as a current flowing through the soft-magnetic material, following a closed path surrounding the laminated core.

The homotopically equivalence between a flat lamination and a ball indicates that the flat lamination can virtually be shaped to become a ball by using only bending, stretching and/or shrinking operations. In this, cutting or gluing operations are not allowed. In a similar way the homotopically equivalence between a solid stack and a ring indicates that the stack can virtually be shaped to become a ring, by applying only bend, stretch and/or shrink operations.

With the expression "to create at least one complete physical interruption for circulating currents in the plane of the laminations" here means in other words that in the plane of the laminations an almost completely closed soft-magnetic path arises, enclosing the rotor, with at least one physical interruption for circulating currents.

An "almost completely closed soft-magnetic path enclosing the rotor" means a path that is enclosing the rotor, and preferably consists of at least 75% soft-magnetic material. Or even more preferred, consisting of at least 95% soft-magnetic material.

The current invention also relates to a method for constructing a laminated core for a stator or a rotor of a combined radial-axial magnetic bearing, whereby the method comprises the following steps:

providing a set of flat soft-magnetic laminations whose topological shape is homotopically equivalent to that of a ball;

arranging a first soft magnetic layer in such a way that at least one physical interruption for circulating currents is obtained;

pivoting and/or turning (i.e., rotating) all subsequent soft magnetic lamination layers with respect to their previous soft magnetic layers;

solidifying the resulting set of soft magnetic layers.

The invention also relates to a method for constructing a laminated core for a stator or a rotor of a combined radial-axial magnetic bearing, in which the method comprises the steps of:
  providing a set of flat soft-magnetic laminations whose topological shape is homotopically equivalent to that of a ball;
  arranging a first plurality of soft magnetic layers in such a way that at least one physical interruption for circulating currents is obtained, and that at least one physical interruption in all adjacent layers coincide;
  arranging subsequent pluralities of lamination layers in the same way as the first plurality of soft magnetic layers, but in such a way that subsequent pluralities of soft magnetic layers are rotated (pivoted and/or turned) with respect to their previous plurality of soft magnetic layers;
  solidifying the resulting set of soft magnetic layers.

By constructing a stator core or rotor core of a combo bearing in this way, circulating eddy currents due to the varying control flux cannot develop. Consequently, the losses in the bearing decrease and the axial actuator performance increases.

BRIEF DESCRIPTION OF THE DRAWINGS

With the intention of better showing the characteristics of the invention, hereafter, by way of example without being limitative in any way, a description is given of some preferred embodiments of a laminated core for a stator or a rotor of a combined radial-axial magnetic bearing according to the invention, reference being made to the accompanying drawings, wherein.

DETAILED DESCRIPTION OF THE DRAWINGS

Figure 1:
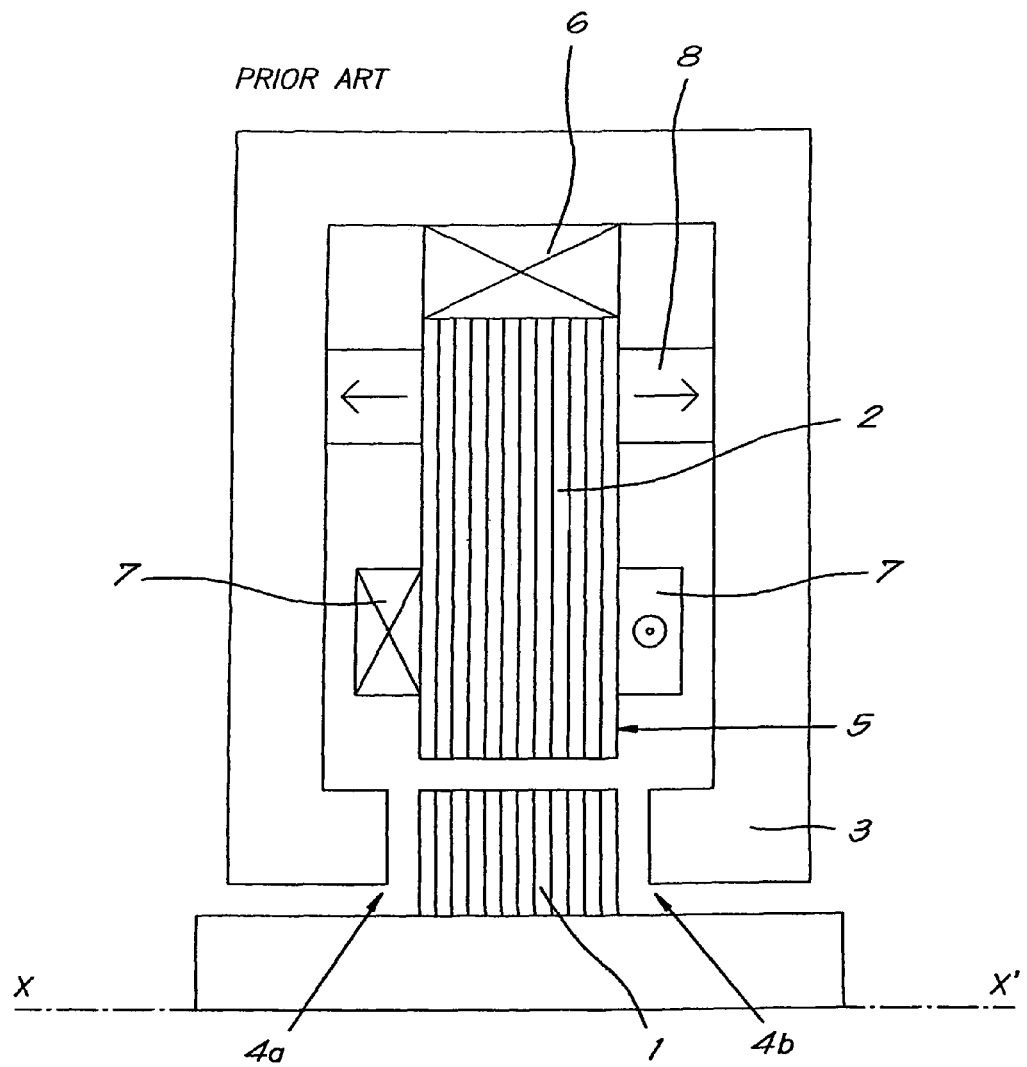
FIG. 1 represents a half longitudinal cross section of a first combo bearing type with permanent magnet bias, according to prior art.
Figure 2:
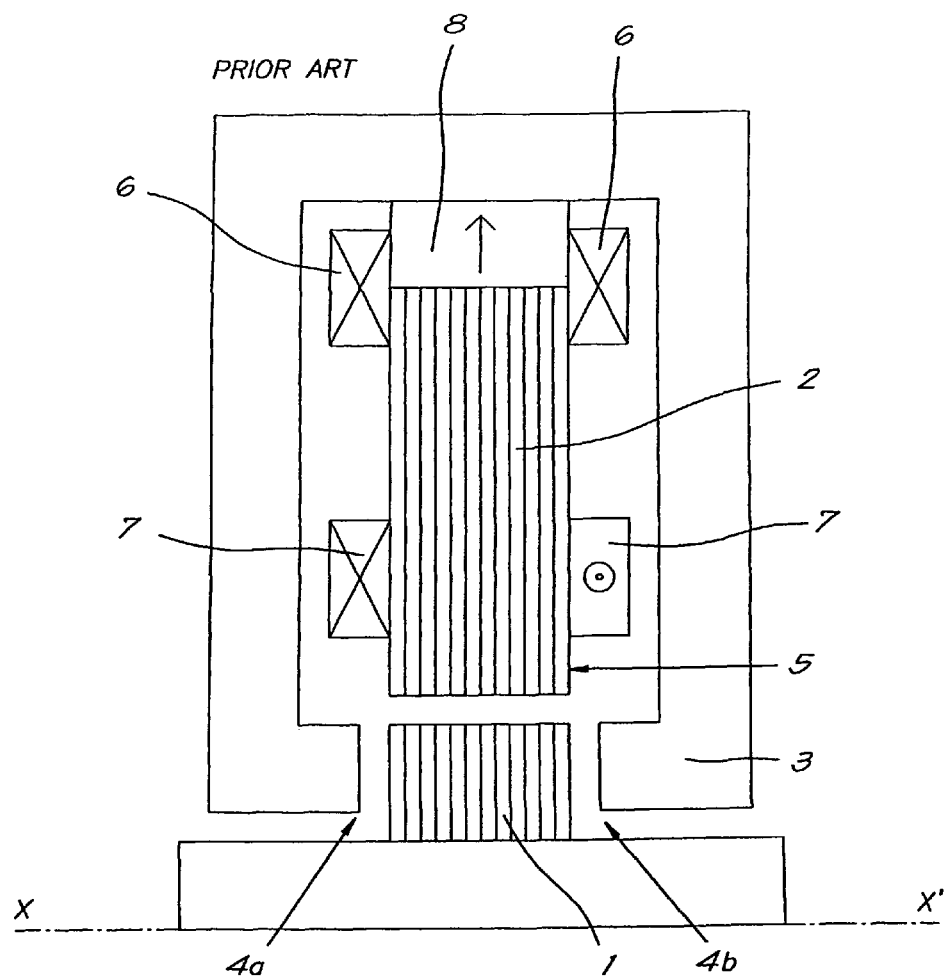
FIG. 2 represents a longitudinal cross section of a second combo bearing type with permanent magnet bias, according to prior art.
Figure 3:
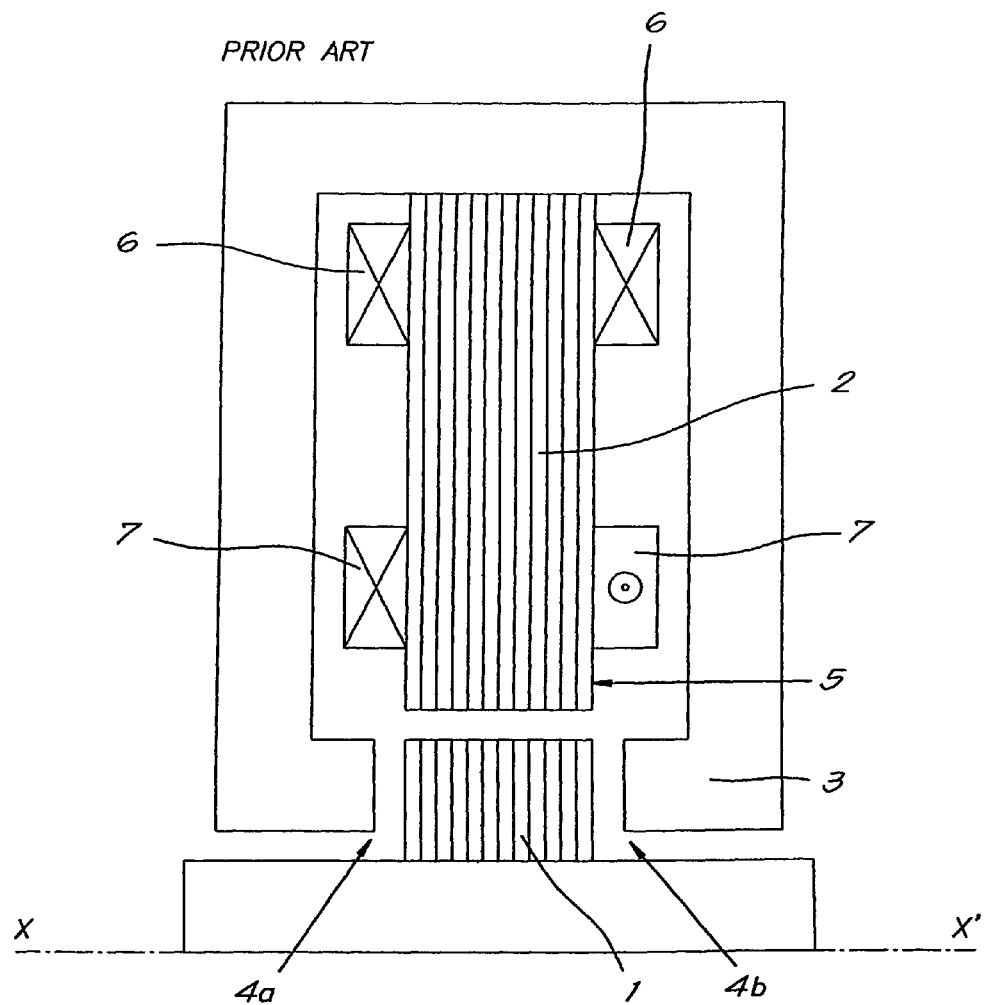
FIG. 3 represents a longitudinal cross section of a third combo bearing type with current bias, according to prior art.
Figure 4:
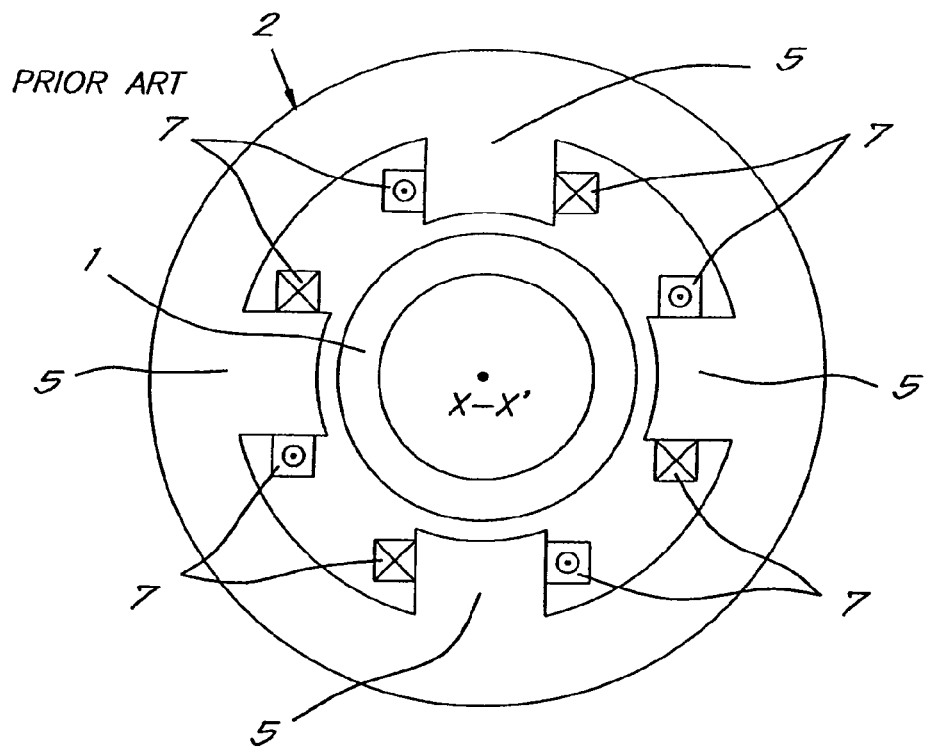
FIG. 4 represents a cross section of the four-pole radial actuator part of a first combo bearing type, according to prior art.
Figure 5:
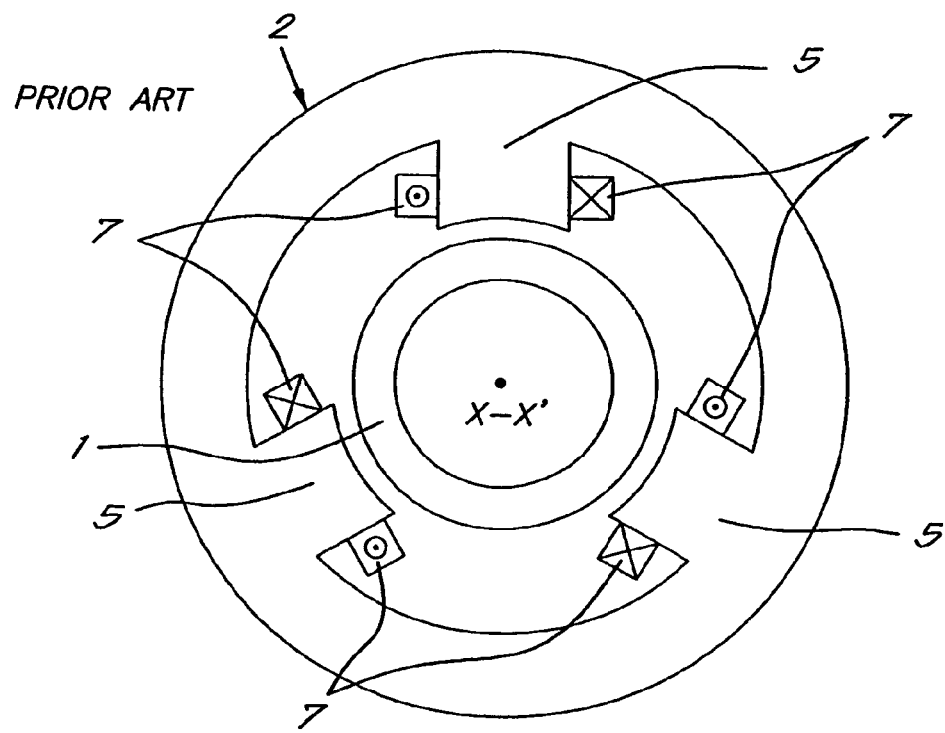
FIG. 5 represents a cross section of the three-pole radial actuator part of a second combo bearing type, according to prior art.

Some longitudinal cross sections of existing combo bearing types are shown in FIGS. 1, 2 and 3. Two possible radial cross sections of existing combo bearing types are shown in FIGS. 4 and 5. The alternative designs depicted, are all composed of a laminated rotor stack 1 with a geometric rotation axis X-X', a laminated stator stack 2, a stator yoke 3, two axial poles 4a and 4b and at least three radial poles 5. Axial forces are controlled by an axial control coil 6, whose construction is rotationally symmetric. Radial forces are controlled by radial control coils 7. They are wound around the radial poles 5. If the bias field is not generated by permanent magnets 8, it may be generated by adding a bias current in some particular way to the axial control current or by supplying a bias current to a separate bias coil, having a rotationally symmetric shape as well and being located close to the axial control coil 6.

If a current is supplied to a radial control coil 7, flux starts flowing in the plane of the laminations of the stator stack 2. The flux generated by a current supplied to the axial control coil 6 flows through the stator yoke 3, subsequently passes into an axial pole 4a, crosses the gap towards the rotor stack 1, crosses the gap towards the opposite axial pole 4b and eventually returns into the stator yoke 3. Consequently, since the axial control current varies in time, a time-varying flux crosses the central hole of the stator stack 2. According to Faraday-Lenz' and Ohm's laws, circular currents are induced in the laminations of the stator stack 2. Therefore, it is the object of the present invention to physically interrupt the path for these induced circulating currents.

Figure 6:
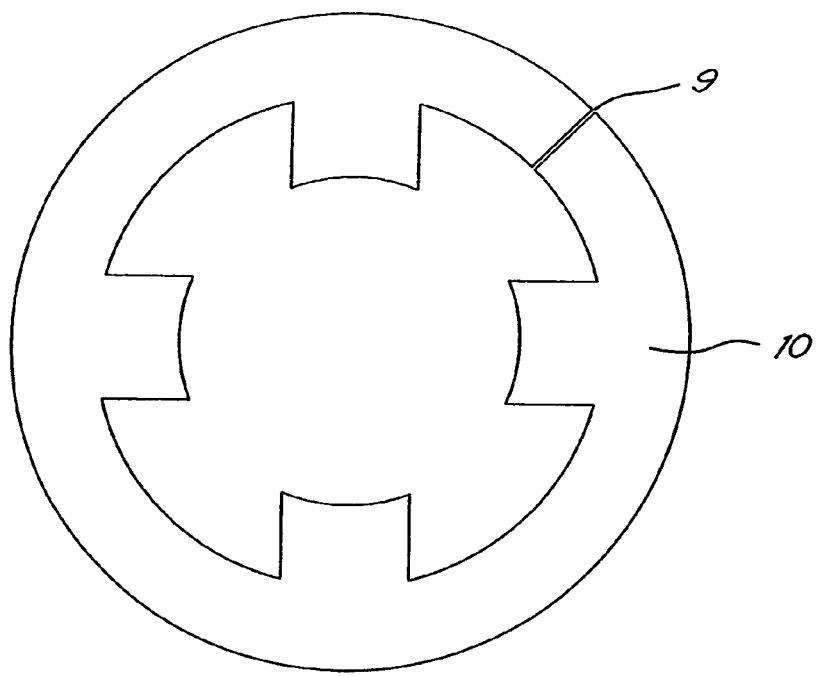
FIG. 6 represents a cross section of a $360_<^\circ$ lamination of a four-pole radial actuator part of a combo bearing, split on a symmetry axis.

One possibility to realize this physical interruption is providing a single cut 9 in each $360_<^\circ$ lamination 10 of the stator stack 2, as shown in FIG. 6 for the case of a four-pole stator stack 2. The notation $360_<^\circ$ indicates that the lamination covers an angle just under 360°, because of the present cut 9. Obviously, such a cut 9 introduces a considerable tangential reluctance in practice, as cutting widths below 0.25 mm are difficult to obtain. Therefore, the lamination 10 looses part of its magnetic symmetry for the radial control field. A hypothetical stator stack having only one single lamination 10 would exhibit significant radial channel performance loss due the cut. However, the stacking of laminations 10 provides a way of avoiding this performance loss.

Figure 7:
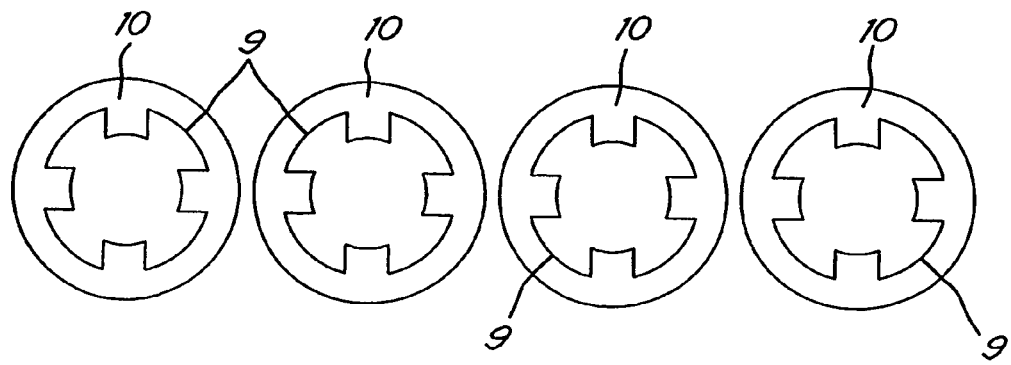
FIG. 7 represents all possible positions to which the lamination of FIG. 6 can be pivoted, with preservation of the position of the poles.

FIG. 7 shows all possible positions to which the $360_<°$ lamination 10 with a single cut 9 of FIG. 6 can be pivoted, without having an effect on the position of the four poles 5. Hence, if the stator is stacked in such a way that the cuts 9 of adjacent $360_<°$ laminations 10 are always separated from each other, a magnetic field line can cross a cut by changing from $360_<°$ lamination 10. It thereby needs to traverse twice through the coatings of adjacent laminations 10. The key issue here is that lamination coatings can be made much thinner than the width of a cut, e.g. 1 µm compared to at least 250 µm.

Figure 8:
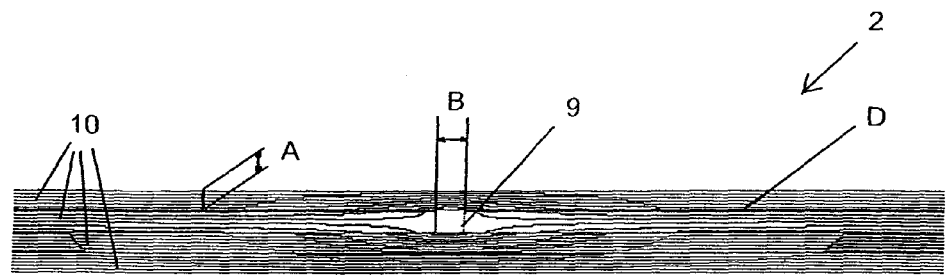
FIG. 8 represents the distribution of magnetic field lines in the vicinity of a split having tangential dimension 0.5 mm, for a stack being composed of four double-sided 10 μm coated lamination sheets of thickness 0.35 mm.

FIG. 8 shows a cross-section of a stator stack 2, composed out of four laminations 10. The figure is a cross-section orthogonal to the plane of the laminations 10, tangential with respect to the center of the stack, made on the position of a cut 9 in one of the laminations 10. The distribution of the magnetic field lines of the radial control fields in the vicinity of the cut 9 is shown in FIG. 8. In this particular example, the laminations 10 have a thickness of 0.35 mm; the width B of the cut 9 is 0.5 mm; the thickness D of the coating is 10 µm, implying 20 µm in between the soft-magnetic parts (double-sided coating). When approaching the cut 9, the field lines split up in two halves. Inside the cut 9 there are hardly any field lines. Once beyond the cut 9, the field lines come back together in the original lamination 10.

Figure 9:
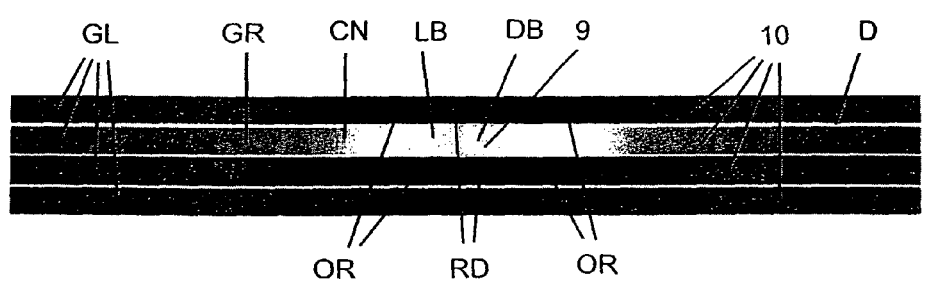
FIG. 9 represents the distribution of the magnetic flux density in the vicinity of a split having tangential dimension 0.5 mm, for a stack being composed of four double-sided 10 μm coated lamination sheets of thickness 0.35 mm.

Obviously, this influences the local magnetic flux density in the vicinity of the cut 9, as shown in FIG. 9 for an identical stator stack 2 as the one depicted in FIG. 8. Inside the cut 9, there are hardly any magnetic field lines, causing the flux density to be almost zero there. This is expressed by the dark blue (DB) shading in FIG. 9. When leaving the area of the cut along the plane of the lamination, the flux density gradually increases up to its nominal value, as expressed by the color change from dark blue (DB) via lighter blue (LB) and cyan (CN) and further from green (GR) to yellow (GL). In adjacent laminations, the flux density increases when approaching the cut, as expressed by the color change from yellow (GL) via orange (OR) to red (RD).

In this particular example, in which the coating is fairly thick, the flux density is predominantly affected in the adjacent laminations 10 only. The other laminations are only slightly affected. In theory, the flux density in a lamination 10 may locally increase up to 1.5 times its normal value. However, the thinner the coatings are, the more spreading of the field lines may be expected, causing further reduction of the local peak flux density.

From FIGS. 8 and 9, it may also be concluded that the size of the region in which the flux density is influenced by the cut 9 is not bigger than a few millimeters. Consequently, when large radial control currents are to be supplied, there may be some local saturation, but its impact on the global performance of the bearing will remain small.

In order to globally restore the original magnetic symmetry, it is advised to evenly distribute the cuts 9 over the circumference of the stator stack 2. Given the alternative positions of the $360_<°$ laminations 10 in FIG. 7, it is e.g. possible to create a stator stack 2 with a repetitive pattern of four $360_<°$ laminations. The shortest axial distance between cuts 9 then equals about 4 times the thickness of the laminations 10.

Figure 10:
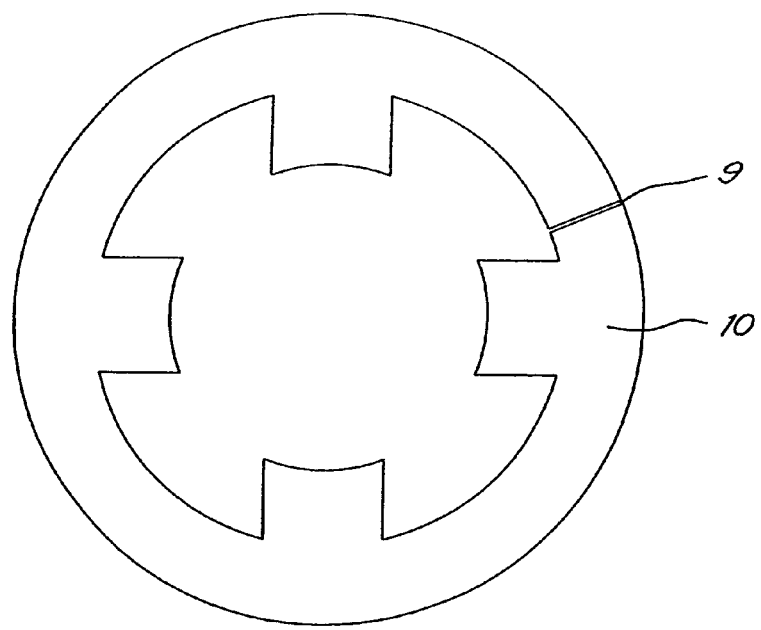
FIG. 10 represents a cross section of a $360_<^\circ$ lamination of a four-pole radial actuator part of a combo bearing, not split on a symmetry axis.
Figure 11:
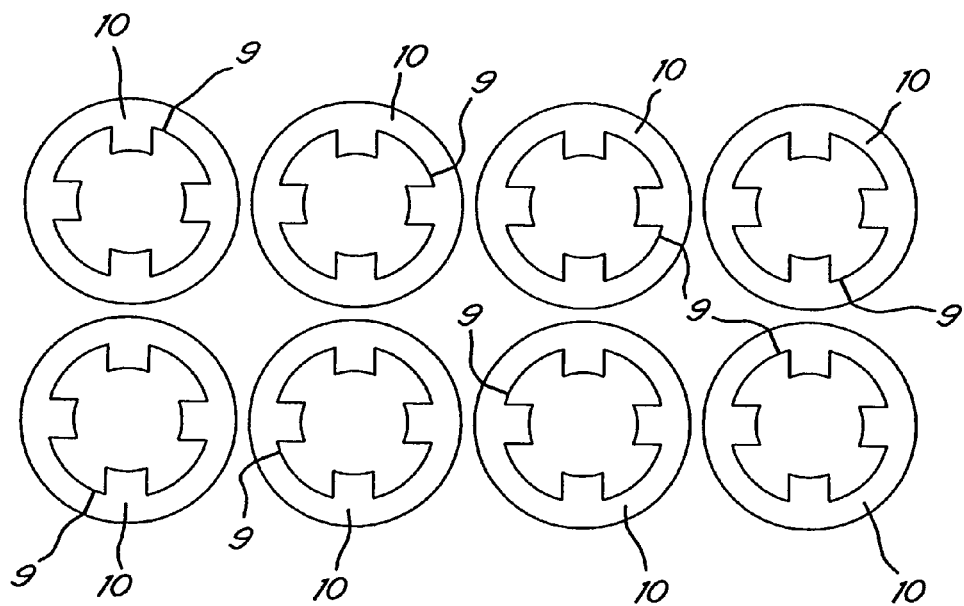
FIG. 11 represents all possible positions to which the lamination of FIG. 10 can be rotated (pivoted and/or flipped), with preservation of the position of the poles.

The $360_<°$ lamination 10 depicted in FIG. 6 is provided with a cut 9 that coincides with a symmetry axis. However, this is not imperative. On the contrary, a cut non-coinciding with the symmetry axis can be considered to further increase the minimal axial distance between the cuts 9. For example, the $360_<°$ lamination 10 depicted in FIG. 10, having four poles 5, is equipped with a cut 9 that does not coincide with a symmetry axis. By pivoting and/or flipping this lamination 10, eight different positions can be found in which the position of the poles 5 is preserved, as demonstrated by FIG. 11. Stacking those yields a magnetically symmetric stator stack 2 with a repetitive pattern of eight laminations 10 and the shortest axial distance between the cuts is eight laminations 10 as well.

Figure 12:
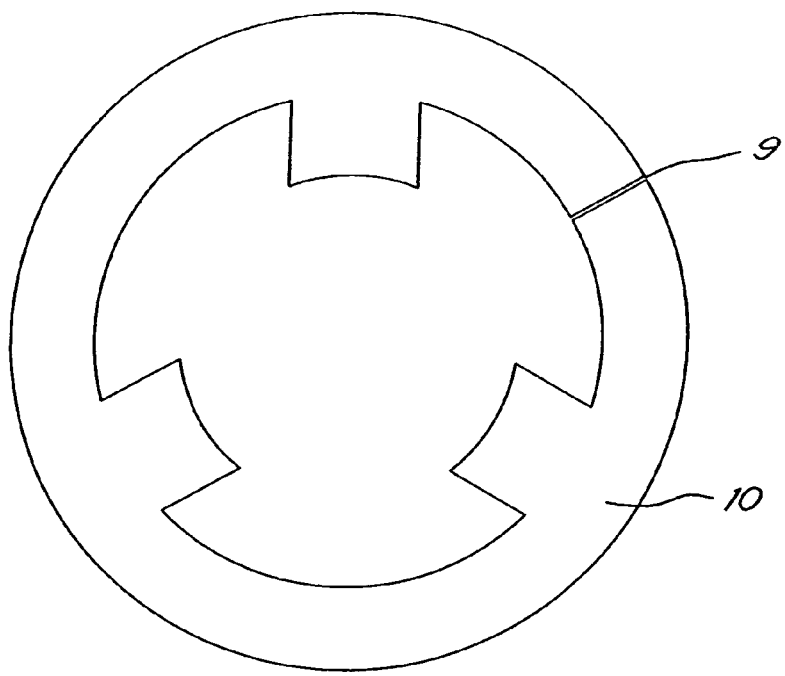
FIG. 12 represents a cross section of a $360_<^\circ$ lamination of a three-pole radial actuator part of a combo bearing, split on a symmetry axis.
Figure 13:
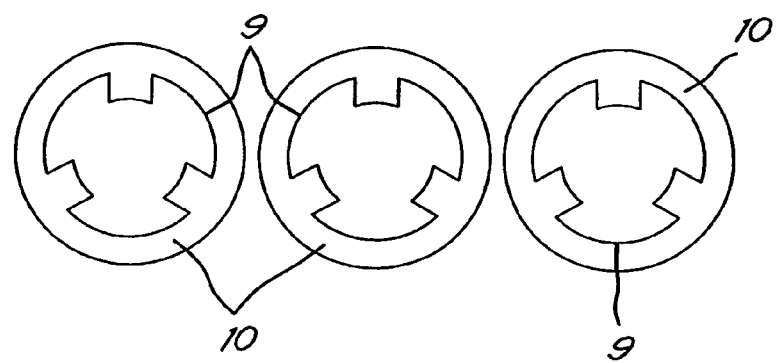
FIG. 13 represents all possible positions to which the lamination of FIG. 12 can be rotated, with preservation of the position of the poles.

FIG. 12 shows a $360_<°$ lamination 10 with only three poles 5, where a single cut 9 is provided on a symmetry axis. FIG. 13 shows that pivoting the lamination 10 of FIG. 12 only yields three different positions in which the position of the poles 5 is preserved. After stacking those in such a way that the entire stack is magnetically symmetric, the minimal axial distance between the cuts 9 equals three laminations 10. In this particular configuration, the magnetic field lines can only spread out over a distance of one lamination 10, thus the flux density increase nearby the cut 9 is likely to be close to 50%.

Figure 14:
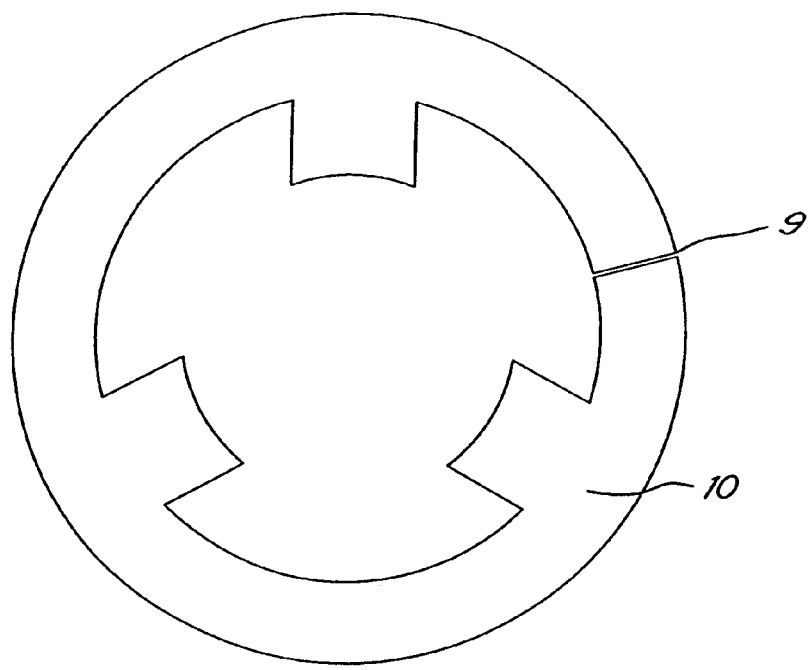
FIG. 14 represents a cross section of a $360_<^\circ$ lamination of a three-pole radial actuator part of a combo bearing, not split on a symmetry axis.
Figure 15:
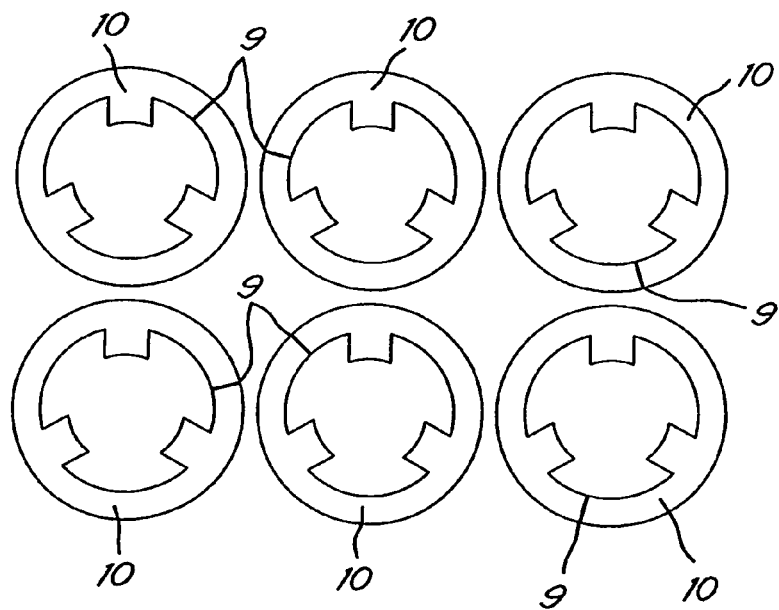
FIG. 15 represents all possible positions to which the lamination of FIG. 14 can be rotated (pivoted and/or flipped), with preservation of the position of the poles.

In order to increase the minimal axial distance between cuts 9 in the case of a stator stack 2 having three poles 5, it is required to make a cut 9 which does not coincide with a symmetry axis, as shown in FIG. 14. In that case, rotating (pivoting and/or flipping) the lamination 10 of FIG. 14 yields six alternative positions for the cut 9, with preservations of the position of the poles 5, as depicted in FIG. 15. The shortest axial distance between cuts 9 then equals about six times the thickness of the laminations 10.

Figure 16:
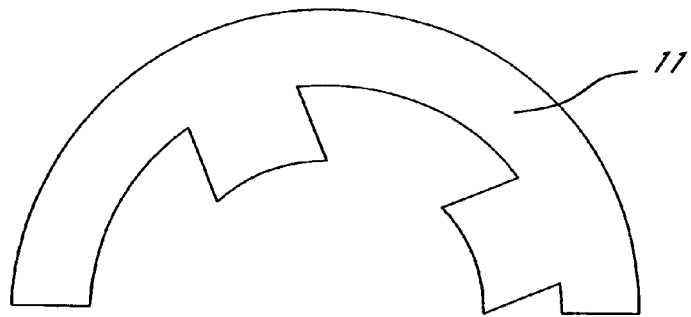
FIG. 16 represents a cross, section of a $180_<^\circ$ lamination segment of a four-pole radial actuator part of a combo bearing.
Figure 17:
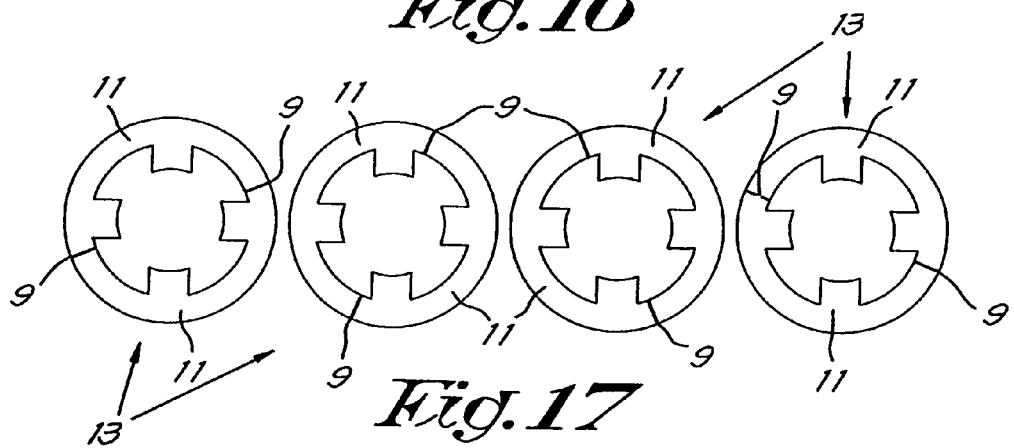
FIG. 17 represents all possible positions to which the lamination segment of FIG. 16 can be rotated (pivoted and/or flipped), with preservation of the position of the poles.
Figure 18:
FIG. 18 represents a cross section of a $120_<^\circ$ lamination segment of a three-pole radial actuator part of a combo bearing.
Figure 19:
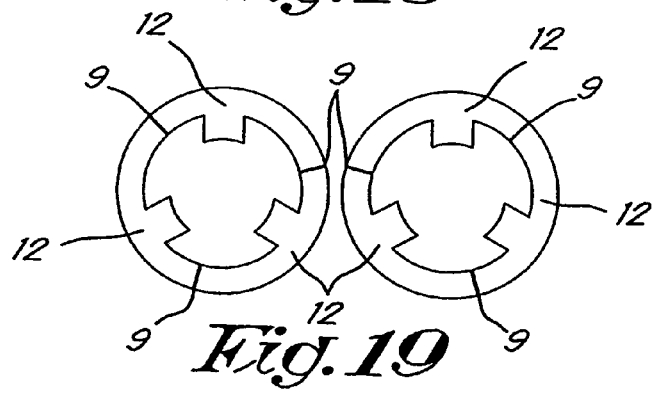
FIG. 19 represents all possible positions to which the lamination segment of FIG. 18 can be rotated (pivoted and/or flipped), with preservation of the position of the poles.

Until now, only examples with a single cut 9 were given. However, this is not a restriction. For example, a stator stack 2 with four poles 5 can be constructed using $180_<°$ laminations 11 as the ones shown in FIG. 16. When properly arranged, two such $180_<°$ laminations 11 form a composed lamination construction 13 having an equivalent of two cuts 9. By rotating (pivoting and/or flipping) the $180_<°$ lamination 11 of FIG. 16, four arrangements can be found for which the cuts 9 are in different positions, with preservation of the position of the poles 5, as shown in FIG. 17. Stacking these yields a stator stack 2 with a repetitive axial pattern of four $180_<°$ laminations 11 and a minimal axial distance between the cuts 9 of four $180_<°$ laminations 11 as well. One reason to choose for such an arrangement with $180_<°$ laminations 11 instead of $360_<°$ laminations 10 with a single cut 9 is the potential waste reduction with, for instance, punching.

In all possible embodiments covered by the previous descriptions, the cuts 9 in adjacent lamination layers never coincided. This condition may be relaxed slightly. One can also assemble an actuator target stack 1 or a stator stack 2 as a series of rotated (pivoted and/or flipped) substacks, in which each substack is itself a stack of at least two adjacent lamination layers, having the property that some or all of the cuts 9 in adjacent lamination layers coincide. In this case, magnetic symmetry can be safeguarded by evenly distributing the entire set of cuts 9 over the circumference of the complete stack. Doing so yields a configuration in which the magnetic field can always find a low-reluctant path in the vicinity of a cut, via an adjacent substack. However, since the magnetic field lines must cross more coating layers in this configuration, it may be considered a less favorable arrangement. On the other hand, constructional issues may make this concept a feasible alternative.

Figure 20:
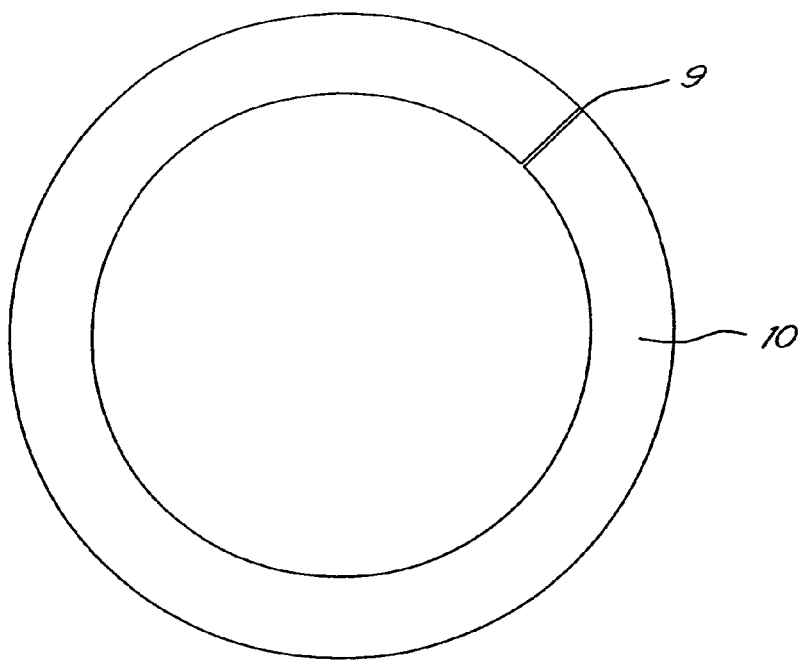
FIG. 20 represents a cross section of a splitted $360_<^\circ$ lamination for an actuator target stack.

The previous discussion focused on some alternatives for three and four pole designs. However, without any loss of generality, the same ideas can be extended to designs with larger number of poles 5 or even to designs without any poles 5. An example of a lamination 10 without poles 5 is given in FIG. 20. Such a design could be used e.g. to assemble the actuator target stack 1 on the rotating part.

The inclusion of a single cut 9 in a 360$_<$° lamination 10 dramatically reduces its mechanical stiffness. However, when stacking them according to the principles of this invention, the stiffness and mechanical integrity of the resulting stack is hardly reduced when compared to the case without cuts 9. If 180$_<$° laminations 11 or 120$_<$° laminations 12 or other composed lamination constructions 13 are used, it is harder but not impossible to obtain similar mechanical properties.

Figure 21:
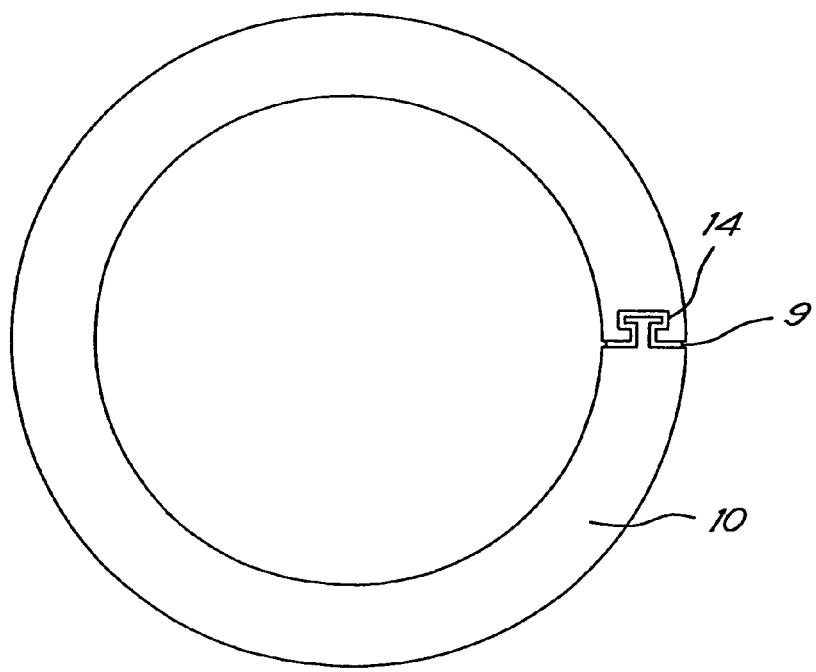
FIG. 21 represents a cross section of a $360_<^\circ$ lamination with a non-straight cut and an insulating spacer.

In all previous examples, the cut 9 was drawn radially and, in case there were poles 5, through the thinnest part of the stack. The ideas of the present invention are not restricted to these particular cases. It may e.g. be thought of having a cut through the poles 5. In the same way, it may be considered to realize the physical interruption by straight non-radial cuts 9 or even non-straight cuts 9. A reason for applying non-radial cuts can be to further reduce the flux density increase in the vicinity of the cut. A reason for applying non-straight cuts can be to improve the structural properties of the stack when the stack is rotating in operation or when the stack is assembled with 180$_<$° laminations 11 or 120$_<$° laminations 12. In such cases, one could e.g. consider a cut 9 that is shaped like a dovetail-connection, and preferably with an insulating spacer material 14 in between, to avoid any possible electrical contact. This idea is illustrated in FIG. 21.

In all possible embodiments covered by the previous descriptions, the cuts 9 in adjacent lamination layers never coincided. This condition may be relaxed slightly. One can also assemble an actuator target stack 1 or a stator stack 2 as a series of pivoted and/or flipped substacks, in which each substack is itself a stack of at least two adjacent lamination layers, having the property that some or all of the cuts 9 in adjacent lamination layers coincide. In this case, magnetic symmetry can be safeguarded by evenly distributing the entire set of cuts 9 over the circumference of the complete stack. Doing so yields a configuration in which the magnetic field can always find a low-reluctant path in the vicinity of a cut, via an adjacent substack. However, since the magnetic field lines must cross more coating layers in this configuration, it may be considered a less favorable arrangement. On the other hand, constructional issues may make this concept a feasible alternative.

The invention is in no way limited to the forms of embodiment of a laminated core as described above or shown in the drawings, however, such a laminated core can be made in all shapes and dimensions without departure from the scope of the invention.

The invention claimed is:

1. A laminated core of a stator or a rotor of a permanent magnet biased or current biased combined radial-axial magnetic bearing, comprising:
    a solid stack of flat soft-magnetic individual laminations;
    each of said individual laminations comprising a single substantially circular structure and a single physical interruption in the single substantially circular structure, wherein said single physical interruption physically interrupts circulating currents in the plane of the individual lamination;
    wherein said solid stack of flat-soft-magnetic individual laminations forms a cylindrical structure, wherein said cylindrical structure is configured in a way so as to create magnetic symmetry in the solid stack;
    said single physical interruption being filled with an electrically insulating material;
    said single physical interruption in adjacent laminations being rotated with respect to each other in a way such that the single physical interruption of each individual lamination is evenly distributed over a circumference of the solid stack; or
    said solid stack comprising a plurality of substacks in which said single physical interruption in all adjacent laminations in a substack coincide and wherein said single physical interruption of said substacks are rotated with respect to each substack in a way such that the single physical interruption of said substacks is evenly distributed over a circumference of the solid stack.

2. The laminated core according to claim 1, wherein none of said individual laminations are in electric contact with each other.

3. The laminated core according to claim 1, wherein said single physical interruption is straight and radially-oriented.

4. The laminated core according to claim 1, wherein said single physical interruption is straight and not radially-oriented.

5. The laminated core according to claim 1, wherein said single physical interruption is shaped in the form of a dovetail-connection.

6. The laminated core according to claim 1, wherein a cross section of said solid stack reveals no magnetic poles.

7. The laminated core according to claim 1, wherein a cross section of said solid stack reveals more than one lamination.

8. The laminated core according to claim 1, wherein said single physical interruption is provided on a symmetry axis of the individual lamination.

9. The laminated core according to claim 1, wherein said single physical interruption is provided in a way such that said single physical interruption does not coincide with a symmetry axis of the individual lamination.

10. A rotating machine comprising a magnetic bearing according to claim 1, wherein a magnetic field can always find a low-reluctant path in the vicinity of a cut, via an adjacent substack.

11. A method for constructing a laminated core for a stator or a rotor of a combined radial-axial magnetic bearing, comprising the steps:
    providing a set of flat soft-magnetic laminations, wherein each of said laminations comprises a single substantially circular structure;
    arranging a first soft-magnetic layer in such a way that a single physical interruption for induced circulating currents is obtained, wherein said single physical interruption in provided in the single substantially circular structure of each lamination;
    rotating all subsequent soft-magnetic layers with respect to their previous soft magnetic layers so that said single physical interruption in adjacent laminations are rotated with respect to each other in a way such that the single physical interruption of each individual lamination is evenly distributed over a circumference of the set of flat soft-magnetic laminations to create magnetic symmetry in the set of flat soft-magnetic laminations; and
    solidifying the resulting set of soft-magnetic layers.

12. The method according to claim 11, wherein an electrically insulating material is provided inside said at least one physical interruption.

13. A method for constructing a laminated core for a stator or a rotor of a combined radial-axial magnetic bearing, comprising the steps:
    providing a set of flat soft-magnetic laminations, wherein each of said flat soft-magnetic laminations comprises a single substantially circular structure having a single physical interruption in the single substantially circular structure;

assembling a first substack by arranging a first plurality of soft-magnetic layers in such a way that said single physical interruption for induced circulating currents is obtained per lamination layer, and in such a way that said single physical interruption in all adjacent lamination layers coincide;

assembling subsequent substacks by arranging subsequent pluralities of soft-magnetic layers in the same way as the first substack with the first plurality of soft-magnetic layers, but in such a way that all subsequent substacks with their pluralities of soft-magnetic layers and said single physical interruption are rotated with respect to their previous substack with a plurality of soft-magnetic layers in a way such that the single physical interruption of each substack is evenly distributed over a circumference of the set of flat soft-magnetic laminations to create magnetic symmetry in the set of flat soft-magnetic laminations; and solidifying the resulting set of soft-magnetic layers.

14. The method according to claim 13, including providing an electrically insulating material inside said single physical interruption.

* * * * *